United States Patent
Terruzzi (10) Patent No.: US 12,459,833 B2
(45) Date of Patent: Nov. 4, 2025

(54) PROCESS FOR THE PREPARATION OF NON-FIBROUS ALKALINE TITANATES WITH HIGH SPECIFIC SURFACE AND POROSITY

(71) Applicant: Mario Gerardo Terruzzi, Calvenzano (IT)

(72) Inventor: Mario Gerardo Terruzzi, Calvenzano (IT)

( * ) Notice: Subject to any disclaimer, the term of this patent is extended or adjusted under 35 U.S.C. 154(b) by 960 days.

(21) Appl. No.: 17/416,915

(22) PCT Filed: Dec. 18, 2019

(86) PCT No.: PCT/IB2019/060992
§ 371 (c)(1),
(2) Date: Jun. 21, 2021

(87) PCT Pub. No.: WO2020/128882
PCT Pub. Date: Jun. 25, 2020

(65) Prior Publication Data
US 2022/0081316 A1 Mar. 17, 2022

(30) Foreign Application Priority Data
Dec. 20, 2018 (IT) .................. 102018000020470

(51) Int. Cl.
*C01G 23/02* (2006.01)
*C01G 23/00* (2006.01)
*C04B 35/462* (2006.01)
*F16D 69/02* (2006.01)

(52) U.S. Cl.
CPC .......... *C01G 23/005* (2013.01); *F16D 69/026* (2013.01); *C01P 2002/72* (2013.01); *C01P 2004/03* (2013.01); *C01P 2004/54* (2013.01); *C01P 2006/60* (2013.01); *F16D 2200/0065* (2013.01)

(58) Field of Classification Search
None
See application file for complete search history.

(56) References Cited

U.S. PATENT DOCUMENTS

| | | | |
|---|---|---|---|
| 3,952,090 A | 4/1976 | Shimizu et al. | |
| 4,064,224 A | 12/1977 | Kawamata et al. | |
| 4,390,513 A * | 6/1983 | Fujiki | C01G 23/005 423/598 |
| 6,335,096 B1 | 1/2002 | Konnai | |

FOREIGN PATENT DOCUMENTS

| | | |
|---|---|---|
| CN | 105050958 A | 11/2015 |
| EP | 1 036 766 | 9/2000 |
| EP | 2 138 461 | 12/2009 |
| JP | S56-017999 A | 2/1981 |
| JP | 2008-110918 A | 5/2008 |
| WO | 2008/012673 A2 | 1/2008 |
| WO | 2008/012851 | 1/2008 |

OTHER PUBLICATIONS

Office Action issued in Chinese Patent Application No. 201980084135.1 dated Jan. 10, 2023.
Zhang et al., "4.3.3.3 Kinetic conditions for glass formation," Fundamentals of Materials Science, Wuhan University of Technology Press, Aug. 2004, pp. 186-188.
Office Action issued in Chinese Patent Application No. 201980084135.1 dated Aug. 22, 2023.
International Search Report for PCT/IB2019/060992 dated Apr. 20, 2020, 3 pages.
Written Opinion of the ISA for PCT/IB2019/060992 dated Apr. 20, 2020, 5 pages.

* cited by examiner

*Primary Examiner* — Yun Qian
(74) *Attorney, Agent, or Firm* — NIXON & VANDERHYE (57) ABSTRACT

A process for the preparation of non-fibrous alkaline titanates comprising the steps of: melting alkaline titanate in a furnace at a temperature ranging from 1300° C. to 1500° C. to form a molten product; cooling said molten product by placing it in contact with a material having a temperature equal to or lower than 15° C.

5 Claims, 7 Drawing Sheets

PROCESS FOR THE PREPARATION OF NON-FIBROUS ALKALINE TITANATES WITH HIGH SPECIFIC SURFACE AND POROSITY

This application is the U.S. national phase of International Application No. PCT/IB2019/060992 filed Dec. 18, 2019 which designated the U.S. and claims priority to IT patent application Ser. No. 10/201,8000020470 filed Dec. 20, 2018, the entire contents of each of which are hereby incorporated by reference.

The present invention refers to a process for the preparation of non-fibrous alkaline titanates with high specific surface and porosity.

Alkaline titanates can be used in brake pads, brake linings, clutch linings for automobiles, trucks, railroad cars, aircrafts and various industrial machines and for welding electrodes.

The damage and health risks of asbestos are well known to everyone. From the '90s, asbestos was banned in the United States and in Europe. Since then, various other materials have been tested and used, including potassium and sodium titanate.

Among other things, potassium and sodium titanate have shown a considerable improvement in the stability of the friction coefficient with reduction or annulment of the phenolic resin deterioration which induce the sliding of the discs without braking, in jargon called "Fade", a dangerous phenomenon, for example, in the use of brake pads.

Friction materials are used to control the deceleration of many vehicles of various types, such as industrial equipment, automobiles, aircrafts, bicycles and motorcycles.

In particular, in the field of friction materials, some titanium-based compounds have been studied and used such as, for example, potassium hexatitanate, sodium hexatitanate and potassium octatitanate.

Potassium and sodium are characterized by elongated fibers and have shown a behavior suited to use in the above-mentioned sector.

However, also fibers of this type have recently been considered potential health hazards, and the EU and USA have established maximum size limits for the fibers that can be used.

For example, the EU (EC) Regulation no. 761/2009 of the Commission of 23$^{rd}$ July 2009 defines crystals with a diameter/length ratio equal to or higher than 1:3 as fibers, and requires all material with a content of said fibers higher than 0.1% to be defined as "fibrous" and classified under hazard level Car 2 (possible carcinogen).

In this way, crystals with a ratio lower than 1:3 are not considered fibers and can therefore be used without particular precautions.

The products obtained according to the known art, however, comprise titanate in the form of fibers which, even if mixed with resins or utilized in different uses as described, represent a potential problem and are considered not suitable because they are potentially hazardous, and therefore subject to particular regulations.

The object of the present invention is to provide a process for the preparation of alkaline titanates that results in a non-fibrous powder material.

A further object is to provide a process that results in crystals with a diameter/length ratio lower than 1:3.

A further object is to provide a process that results in crystals with a high specific surface and porosity.

In accordance with the present invention, said objects and others still are achieved by a process for the preparation of non-fibrous alkaline titanates comprising the steps of: melting alkaline titanate in a furnace at a temperature ranging from 1300° C. to 1500° C. to form a molten product; cooling said molten product by placing it in contact with a material having a temperature equal to or lower than 15° C.

Said objects are further achieved by an alkaline titanate powder with formula $A_2Ti_xO_{2x+1}$ wherein A is an alkaline metal included in the group comprising Na, K, Li, Rb, and x represents any number comprised between 2 and 6; wherein said powder comprises particles having a diameter/length ratio lower than 1:3 and a specific surface higher than 10 m$^2$/g.

Further characteristics of the invention are described in the dependent claims. This solution offers various advantages with respect to the solutions of the known art.

The process provides alkaline titanates, in particular potassium titanate and sodium titanate, having crystals with a substantially rounded shape, free from fibrous form structures as defined previously and furthermore extremely spongy with a very high specific surface and high porosity. These characteristics give them a more marked reactivity vis-a-vis phenolic resin, if used in braking systems.

The product obtained can be used as a component of materials with high friction coefficient, in plastic materials, in paints, in heat-resistant materials and in lubricants.

The characteristics and advantages of the present invention will become evident from the following detailed description of a practical embodiment thereof, illustrated by way of non-limiting example in the attached drawings, in which.

The alkaline titanates are represented by the generic formula $A_2Ti_{2x+1}$ wherein A is an alkaline metal like Na, K, Li, Rb, and x represents any number between 2 and 6.

The process for the preparation of alkaline titanates, in particular potassium and sodium titanates, entails the use of TiO$_2$ as synthetic Rutile or Anatase, or also natural Rutile with a minimum concentration of 90% in TiO$_2$ in the form of flour or sand, or also the mineral Leucoxene alone or in a mixture with them.

Potassium or sodium carbonate and/or potassium hydroxide or sodium hydroxide can be used as starting reagents or also other organic derivatives of alkaline metals, although this represents an increase in costs.

If using the mineral Rutile or Leucoxene as raw materials or mixtures thereof, traces of different oxides may be present as impurities.

For example Ca, Mg, Si, Zr, Al, V, Mn, P and oxides of S and also traces of different oxides may be present.

Although the impurities may reach considerable quantities, they are not taken into consideration; they are absent if pure raw materials are used and do not in any way influence the effectiveness of the product.

The materials are mixed in a mixer of any type and are then placed in a furnace of any type, electric or induction or naked flame, in which case fuels, diesel, methane gas or LPG (liquid propane gas) can be used.

The material can be baked in batches or continuously. The operating temperatures of the furnace range from 700° C. to 1000° C., and the duration ranges from 2 to 8 hours or otherwise based on the quantity of the material in the process and the ease with which the furnace reaches the desired temperature.

The material produced in this way, in powder form after being cooled, is then appropriately ground, for example in a ball mill, where the type of balls and coating are chosen based on the granulometry requirements of the finished product.

The alkaline titanates thus produced are fibrous. Said titanates are used as raw material for the subsequent final treatment which will make them non-fibrous.

The same result can be obtained by starting from the raw materials in a direct process, without passing through the stage described above.

The same result can be obtained by starting from the raw materials in a direct process.

The alkaline titanates or the respective raw materials are melted in a crucible or in melting furnaces by batch processes, i.e. discontinuous processes, or in specific furnaces that allow continuous production of the same types described above.

If starting from the respective raw materials, the fusion must be maintained until all of the titanium dioxide is melted by the alkaline salt that melts first. If "pre-produced" titanates are used as raw material, it is sufficient for them to reach fusion which is obtained between 1300 and 1500° C.

The molten product is poured extremely rapidly or left to drip into basins of water, at well temperature (12-15° C.), preferably under stirring to promote thermal exchange, or poured onto surfaces preferably below 15° C. or compressed between cylinders preferably cooled to below 15° C. which simultaneously cool and compress the material, bringing it rapidly back to the solid state, or dripped into a liquid nitrogen bath.

In any case, said molten product is placed in contact with a material (solid or liquid) at a temperature equal to or lower than 15° C.

The rapid cooling and sudden passage from the liquid state to the solid state are a fundamental stage of the invention. The quicker the cooling, the better the product obtained.

The passage from the reaction temperature (1400° C.) to the ambient temperature or lower (if liquid nitrogen is used) takes place in fractions of a second.

According to the cooling method used, the product is dried in the case of cooling in a liquid, then ground with any type of mill deemed suitable for the granulometry required by the market of use.

Alkaline titanates produced in this way result in 99.9% of non-fibrous crystals.

The starting materials used for the production of potassium titanate are Rutile mineral powder in a quantity comprised between 60% and 90% of the total weight, and reagent (for example potassium carbonate) in a quantity comprised between 40% and 10% of the total weight.

In one embodiment example, the starting materials are loaded in the mixer, in a quantity of 100 Kg of $K_2CO_3$ and 350 Kg of rutile for each batch, mixed until fully blended, and then the material is loaded in a tank with a valve on the bottom for loading in the furnace.

The total quantity of material loaded in the furnace for each batch is 450 Kg and the theoretical quantity of the end product is 415 Kg per batch, because the material normally dispersed in the fumes is approximately 15-20 kg for each batch. The furnace runs on LPG.

Each batch is made to react for three hours at a temperature of 1000° C. At the end of the reaction, the batch is emptied onto a flat steel surface having a temperature preferably below 15° C., and placed at ambient temperature and dispersed on the same surface.

At this point, the material has an appearance of granular agglomerates with dimensions ranging from a few millimeters to several centimeters, and is fibrous.

At this point, it can be placed still hot, or scorching, or cold into a melting furnace and brought to fusion, after which the furnace is opened and the material in the molten state is poured into a tank full of water at a temperature lower than or equal to 15° C., so that the thermal shock prevents growth of the crystals.

If water is used for cooling, it is then separated from the water and dried, but could also be ground wet.

Alternatively it can be dried in a dryer, and then ground dry.

It can be used as it is, ground in a hammer mill, for example of the "Danioni" type, with a 50 Kw electric motor, with a yield of 100 kg/h.

Optionally, the ground material can be sieved through a 1 mm mesh sieve.

At the end of grinding, the material is collected and packed according to use and destination, for example in bags. The percentage analysis of the material produced is given in Table 1.

Figure 1:
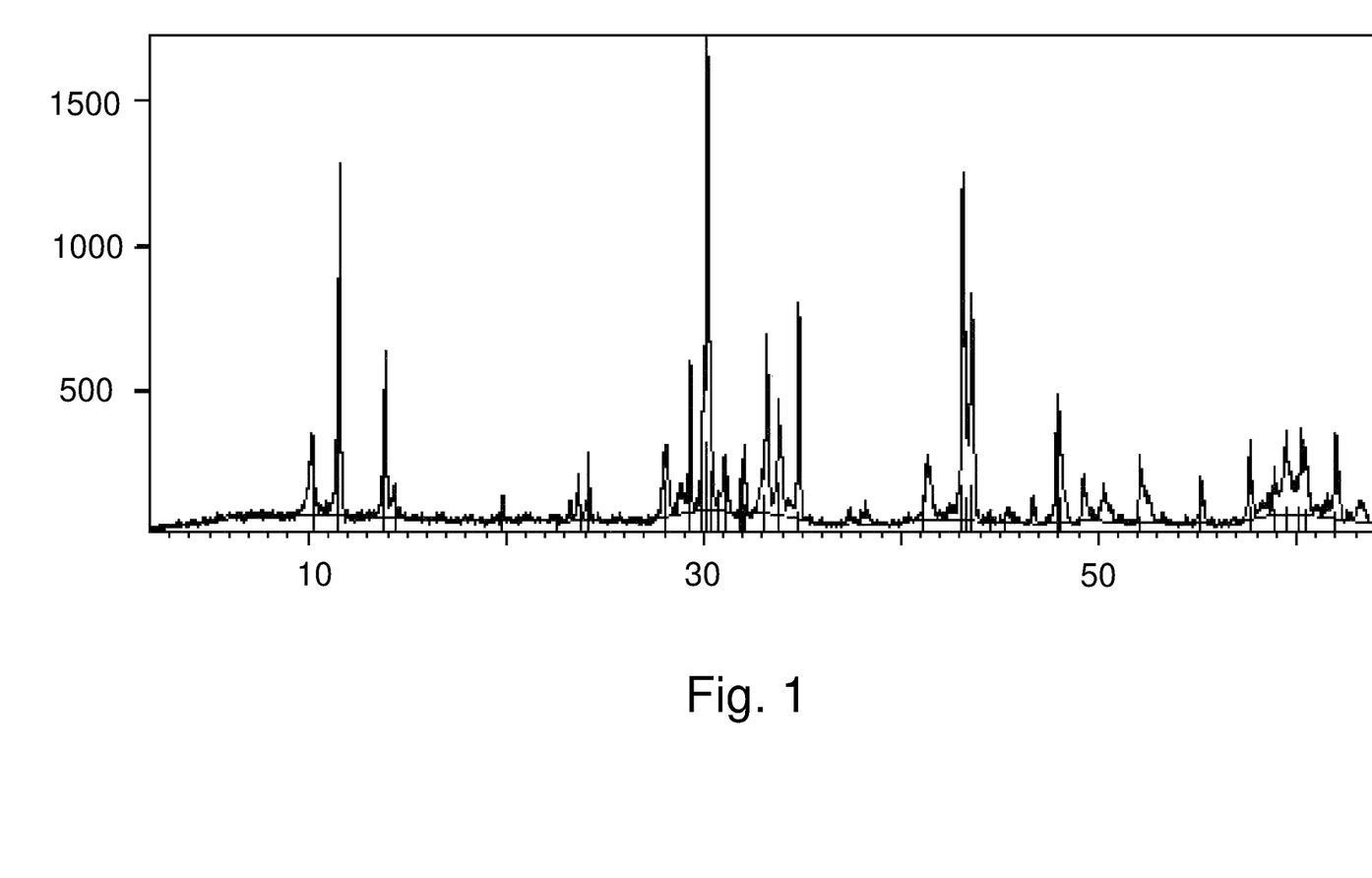
FIG. 1 shows an X-ray crystallography (XRD) of the product obtained, in accordance with the present invention showing, from the 2 theta position of the peaks, that it belongs to the monoclinic structure, therefore identical to that of the fibrous titanate.

An X-ray diffractometry of the product obtained is shown in FIG. 1 where on the X axis we have the position measured in 2 theta and on the Y axis we have the intensity measured in CPS (counts per second).

Figure 2:
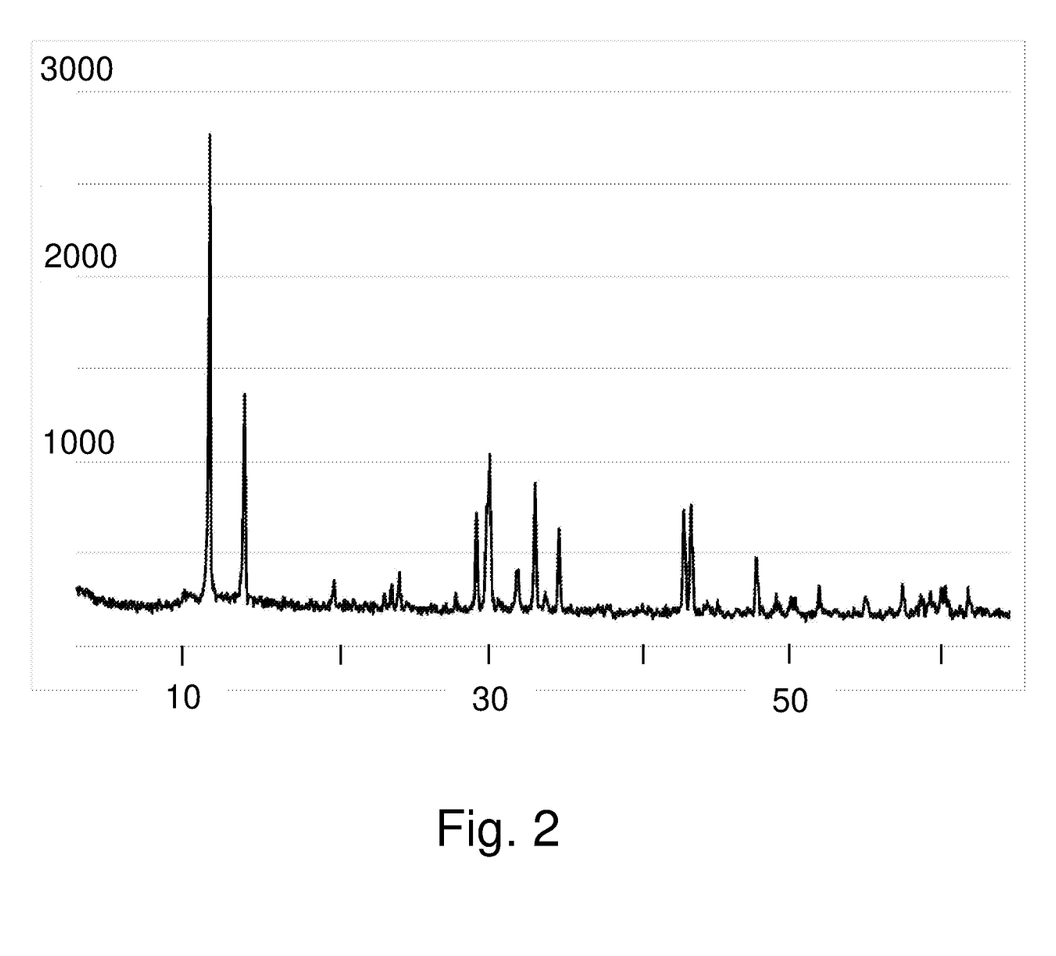
FIG. 2 shows an X-ray crystallography (XRD) of a commercial product of potassium hexatitanate in fibrous form.
Figure 3:
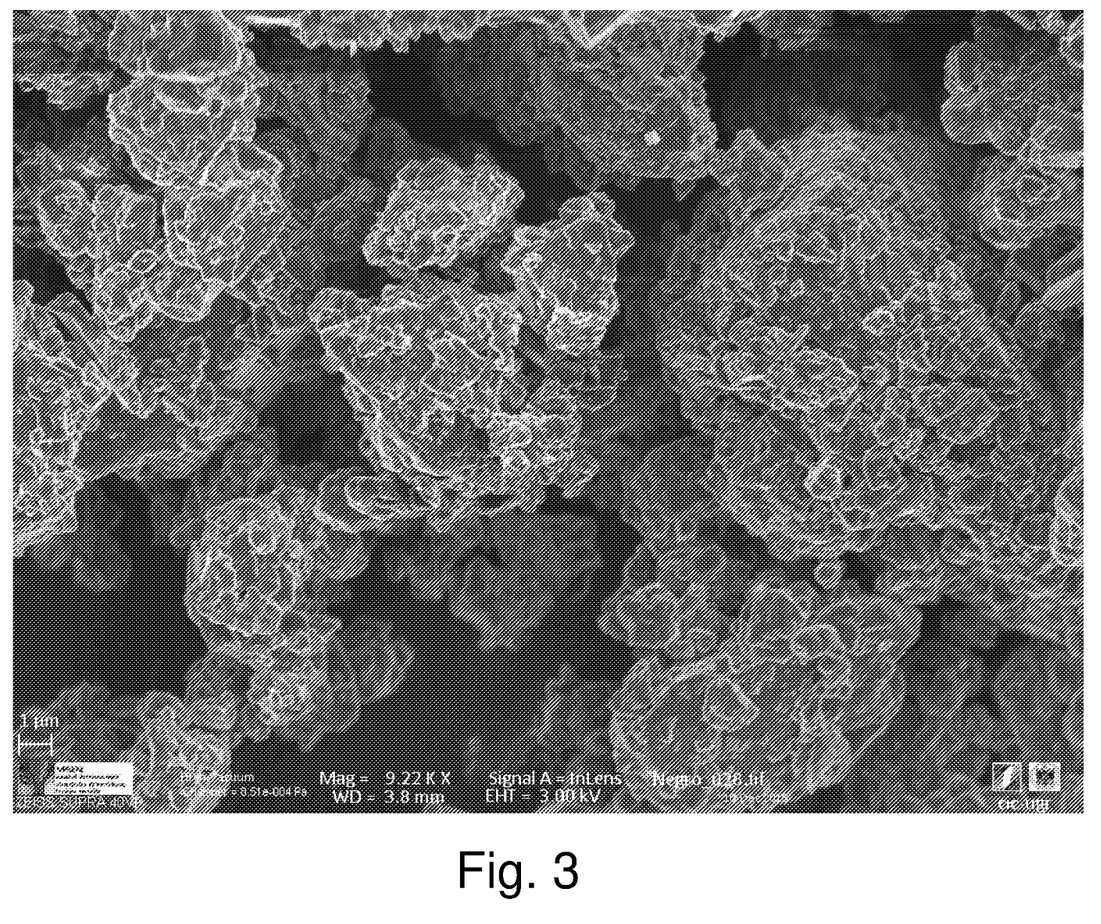
FIGS. 3-7 show electron microscope photographs of the product obtained, at different enlargements, in accordance with the present invention, demonstrating that the same is not in fibrous form, highlighting the spongy morphology and high specific surface thereof.
Figure 4:
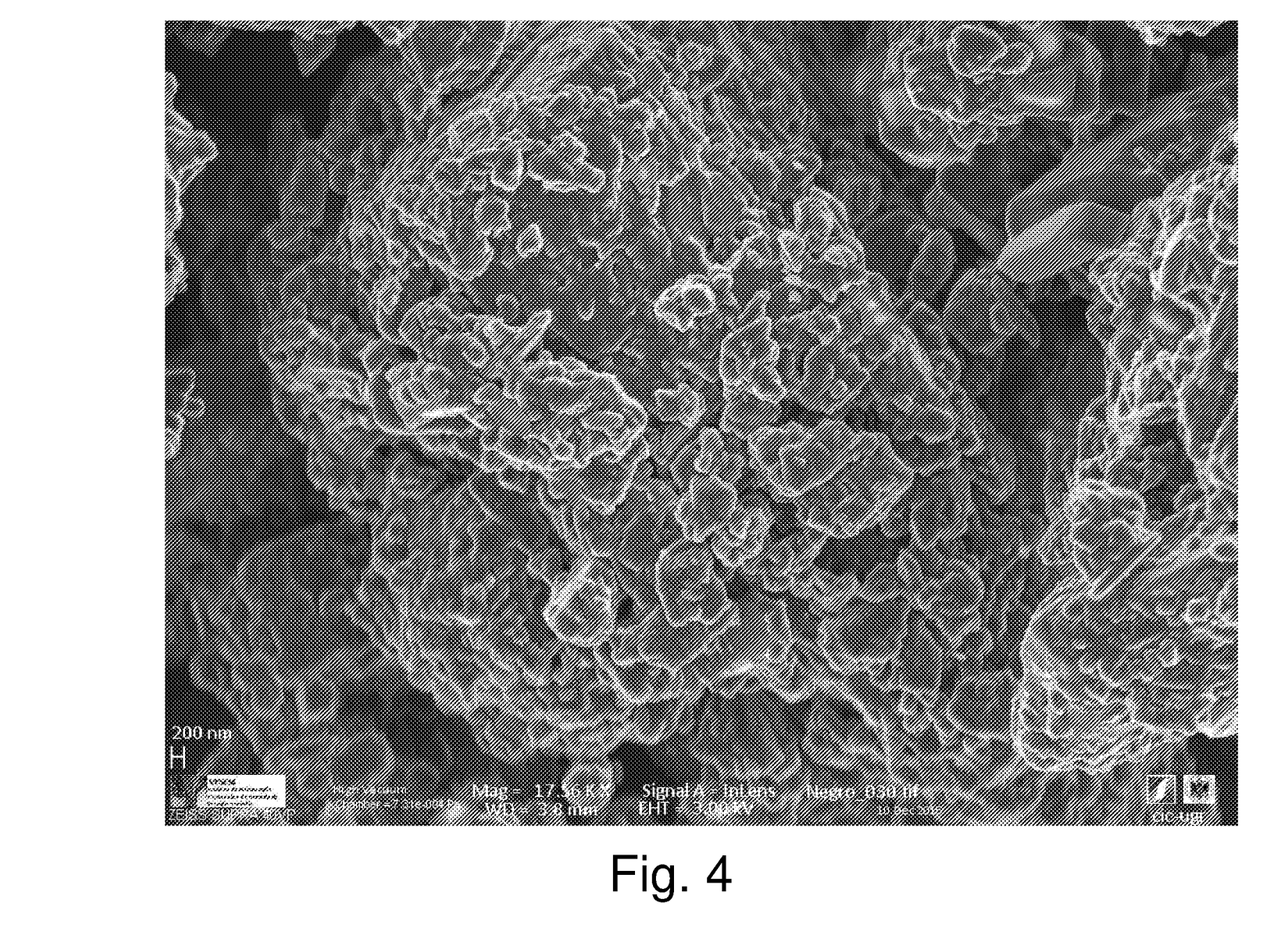
Figure 5:
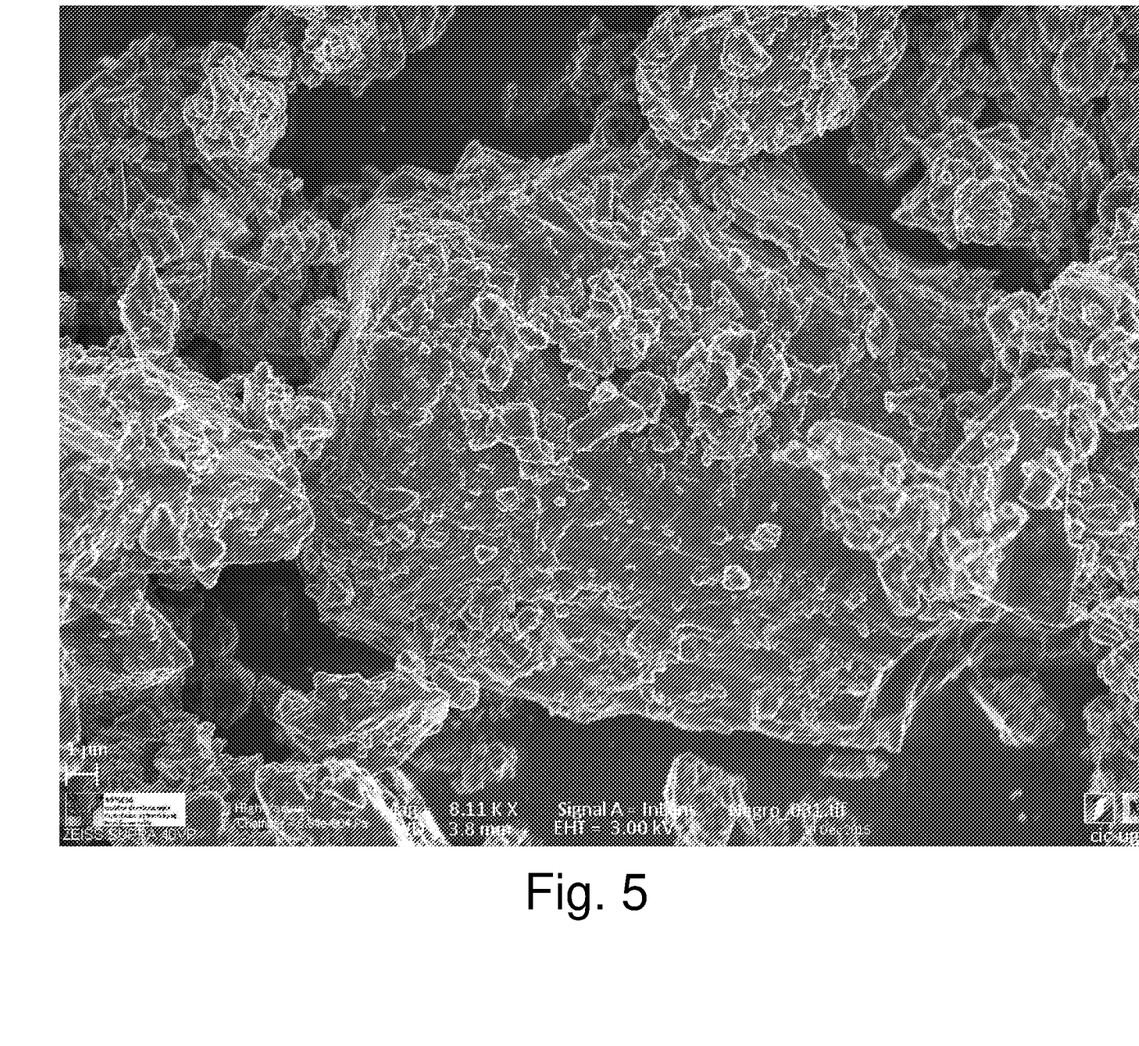
Figure 6:
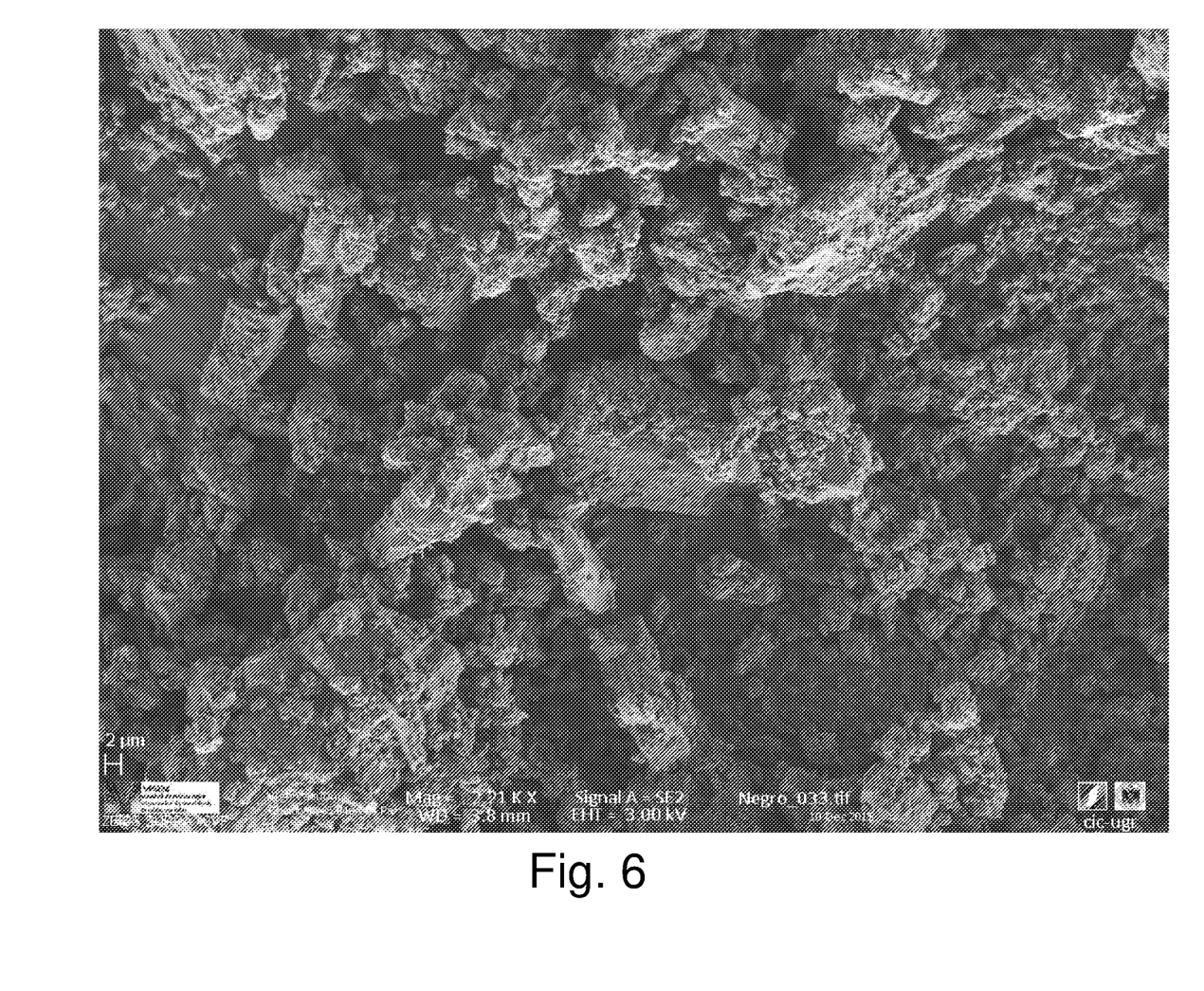
Figure 7:
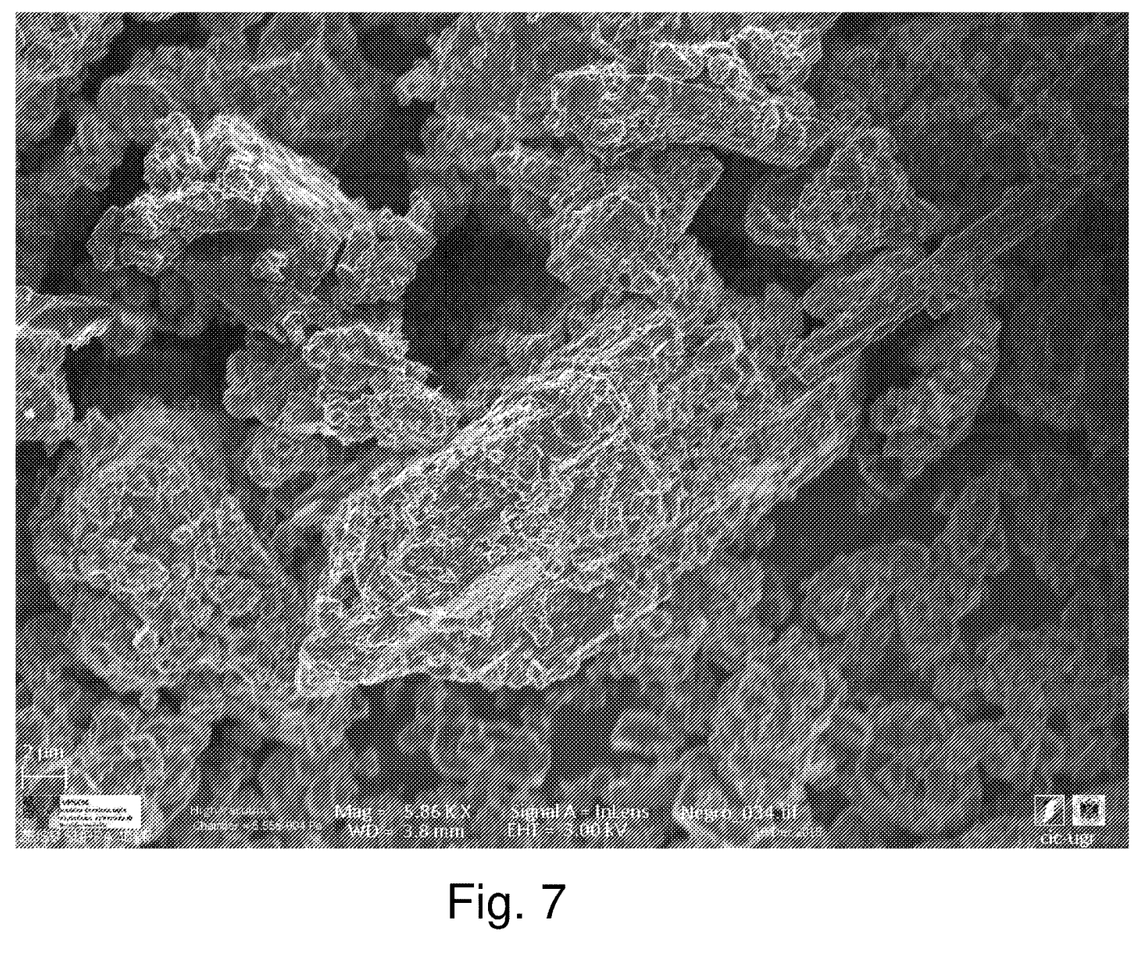

An X-ray diffractometry of a commercial product of potassium hexatitanate in fibrous form is shown in FIG. 2.

A very marked difference in the relative intensity of the peaks clearly shows that the planes on which the crystals lie are extremely different from those of fibrous materials, confirming that the non-fibrous structure of the material produced is an intrinsic characteristic of the crystal.

FIGS. 2-7 show FESEM electron microscope photographs at different enlargements (2000-17000) of the product obtained from which the absence of fibers can be seen, highlighting the spongy morphology with very high specific surface and very high porosity.

The product obtained (powder) has a specific surface greater than 10 $m^2/g$, where the specific surface (sometimes defined also as specific surface area) is the surface area of the granules of a given material, per unit of mass, generally expressed in square meters/gram ($m^2/g$).

The product obtained has a black color due to anomalous non-stoichiometric state of oxidization of the titanium.

TABLE 1

| Element | % |
| --- | --- |
| $K_2O$ | 15.569 |
| $TiO_2$ | 79.232 |
| $ZrO_2 + HfO_2$ | 1.686 |
| $SiO_2$ | 1.601 |
| $Fe_2O_3$ | 0.843 |
| CaO | 0.101 |
| MgO | 0.025 |
| $Al_2O_3$ | 0.480 |
| $V_2O_5$ | 0.430 |
| MnO | 0.008 |

TABLE 1-continued

| Element | % |
|---------|---|
| P | 0.017 |
| S | 0.008 |

The invention claimed is:

1. A process for the preparation of non-fibrous alkaline titanates comprising: melting alkaline titanate in a furnace at a temperature ranging from 1300° C. to 1500° C., to form a molten product; and cooling said molten product by contacting said molten product at a temperature of 1300° C. to 1500° C. with liquid water or liquid nitrogen having a temperature equal to or lower than 15° C.

2. The process according to claim 1, wherein said alkaline titanate thus obtained has a non-fibrous structure and is obtained by mixing sources of titanium dioxide with a reagent material, or is obtained from fibrous titanates.

3. The process according to claim 2, wherein said reagent material is selected from the group consisting of potassium carbonate, sodium carbonate, potassium hydroxide, sodium hydroxide and organic compounds comprising alkaline metals.

4. The process according to claim 2, wherein said titanium dioxide source comprises synthetic rutile and/or natural rutile and/or Anatase and/or Leucoxene.

5. The process according to claim 2, wherein said titanium dioxide is used in quantities ranging from 60% to 90% of the total weight, and said reagent is used in a quantity ranging from 40% to 10% of the total weight.

* * * * *